(12) United States Patent
Kikuchi et al.

(10) Patent No.: US 9,590,220 B2
(45) Date of Patent: Mar. 7, 2017

(54) ROTATION PREVENTING STRUCTURE OF TERMINAL BUS BAR OF BATTERY CONNECTOR

(71) Applicants: YAZAKI CORPORATION, Tokyo (JP); HONDA MOTOR CO., LTD., Tokyo (JP)

(72) Inventors: Yukihisa Kikuchi, Shizuoka (JP); Masaru Imai, Shizuoka (JP); Jun Machida, Saitama (JP); Tomomi Kurita, Saitama (JP)

(73) Assignees: YAZAKI CORPORATION, Tokyo (JP); HONDA MOTOR CO., LTD., Tokyo (JP)

( * ) Notice: Subject to any disclaimer, the term of this patent is extended or adjusted under 35 U.S.C. 154(b) by 139 days.

(21) Appl. No.: 13/938,672

(22) Filed: Jul. 10, 2013

(65) Prior Publication Data
US 2014/0017553 A1 Jan. 16, 2014

(30) Foreign Application Priority Data
Jul. 12, 2012 (JP) .................... 2012-156818

(51) Int. Cl.
 H01M 6/42 (2006.01)
 H01M 2/20 (2006.01)
(52) U.S. Cl.
 CPC .................. H01M 2/206 (2013.01)
(58) Field of Classification Search
 CPC ........................................... H01M 2/206
 USPC ........................................ 429/159
 See application file for complete search history.

(56) References Cited

U.S. PATENT DOCUMENTS

| | | | |
|---|---|---|---|
| 2010/0190050 A1* | 7/2010 | Ochi | 429/160 |
| 2011/0092111 A1 | 4/2011 | Tsuchiya et al. | |
| 2012/0306474 A1 | 12/2012 | Ikeda et al. | |

FOREIGN PATENT DOCUMENTS

| | | | |
|---|---|---|---|
| CN | 101789517 A | | 7/2010 |
| CN | 102057520 A | | 5/2011 |
| JP | 2006-269104 A | | 10/2006 |
| JP | 2006269104 A | * | 10/2006 |
| JP | 2010-176997 A | | 8/2010 |

(Continued)

OTHER PUBLICATIONS

Chinese Office Action for the related Chinese Patent Application No. 201310338276.6 dated Apr. 24, 2015.
(Continued)

*Primary Examiner* — Gary Harris
(74) *Attorney, Agent, or Firm* — Kenealy Vaidya LLP

(57) ABSTRACT

A rotation preventing structure of a terminal bus bar of a battery connector includes a battery pack that includes a pack case in which a battery assembly having arranged batteries is accommodated, a battery connector that is mounted to the battery pack, a terminal bus bar that is formed on the battery connector and has a configuration where an external connection bus bar is fastened to a bolt fixed to one end portion of the terminal bus bar and an electrode of the battery at one end of the arranged batteries is fastened to the other end portion of the terminal bus bar, opposing wall parts that are formed on a case of the battery connector and hold the terminal bus bar, and a pair of support projections that is formed on an end plate of the pack case and holds the opposing wall parts.

6 Claims, 11 Drawing Sheets

(56) References Cited

FOREIGN PATENT DOCUMENTS

WO 2012/036317 A1 3/2012

OTHER PUBLICATIONS

Japanese Office Action for the related Japanese Patent Application No. 2012-156818 dated May 10, 2016.

* cited by examiner

ROTATION PREVENTING STRUCTURE OF TERMINAL BUS BAR OF BATTERY CONNECTOR

CROSS REFERENCE TO RELATED APPLICATION

This application is based on Japanese Patent Applications No. 2012-156818 filed on Jul. 12, 2012, the contents of which are incorporated herein by reference.

BACKGROUND OF THE INVENTION

1. Technical Field

The invention relates to a rotation preventing structure of a terminal bus bar of a battery connector.

2. Background Art

FIG. 8 shows a state where a battery connector 503 is mounted to a battery pack 501 of an electric vehicle (including a hybrid vehicle). The battery pack 501 includes a battery assembly 507 having parallel batteries 505 of a plurality of lines and a pack case 509 that accommodates therein the battery assembly 507. The battery connector 503 is vertically arranged at a front end portion of the battery assembly 507. Each battery 505 is a cylindrical battery 505 that is horizontally accommodated, as shown in FIG. 10.

The battery connector 503 is configured by an insulating resin case 511 and a cover 517 (refer to FIG. 8) consisting of an insulating resin main body part 513 and a sub-body part 515. The case 511 is provided with a plurality of bus bar accommodation parts 519 that is provided in parallel, and is also provided at overall plus/minus parts 521, which are provided at both left and right ends in a longitudinal direction, with terminal bus bar accommodation parts 527 each of which connects an electrode 523 of the battery 505 of the farthest end of the battery assembly 507 to a substantially L-shaped terminal bus bar 525 (refer to FIG. 10).

The terminal bus bar 525 protrudes laterally from the terminal bus bar accommodation part 527 and is configured to open a moveable cover 529, which is openably provided to the case 511, thereby exposing a pole (bolt) 533 of a protrusion 531 of the terminal bus bar 525.

The pole 533 is a bolt having a flat head part, for example. A shaft part of the bolt penetrates a hole of the protrusion 531 and the flat head part is fixed on a backside of the protrusion 531 by welding, crimping or the like. The protrusion 531 orthogonally continues to one plate part 535 of the terminal bus bar accommodation part 527 through an intermediate bent part thereof.

The overall plus/minus part 521 is configured to change an extraction direction of overall plus/minus and to extract a wire arranging path to a direction along which it is possible to easily do a work in accordance with a layout, by the terminal bus bar 525.

For example, JP-A-2006-269104 is known as a related art of the busbar.

As shown in FIG. 11, the pole 533 is prevented from being rotated against fastening torque T by a reactive force that is caused as a load is applied to the fastened electrode 523. Therefore, a force f that separates the plate part 535 of the fastened terminal bus bar 525 is applied to the electrode part of the battery. The force f is not preferable because it may unfasten a nut 537 of the electrode part. Also, the terminal bus bar 525 may be deformed by the fastening torque.

The invention has been made keeping in mind the above situations. An object of the invention is to provide a rotation preventing structure of a terminal bus bar of a battery connector capable of preventing a fastening part of an electrode, which is fixed to the other end portion of the terminal bus bar, from being unfastened without deforming the terminal bus bar or case even when fastening torque is applied to a bolt fixed to one end portion of the terminal bus bar.

SUMMARY OF THE INVENTION

The object of the invention is realized by following configurations.

(1) According to an aspect of the invention, a rotation preventing structure of a terminal bus bar of a battery connector includes a battery pack that includes a pack case in which a battery assembly having arranged batteries is accommodated, a battery connector that is mounted to the battery pack, a terminal bus bar that is formed on the battery connector and has a configuration where an external connection bus bar is fastened to a bolt fixed to one end portion of the terminal bus bar and an electrode of the battery at one end of the arranged batteries is fastened to the other end portion of the terminal bus bar, opposing wall parts that are formed on a case of the battery connector and hold the terminal bus bar between the one end portion and the other end portion of the bus bar, and a pair of support projections that is formed on an end plate of the pack case and holds the opposing wall parts from outer sides of the opposing wall parts.

According to the rotation preventing structure of the terminal bus bar of the battery connector having the above configuration (1), when the external connection bus bar is fastened to the bolt fixed to the one end portion of the terminal bus bar and fastening torque at that time is applied to the bolt, moment of the fastening direction is generated in the terminal bus bar. The rotation of the terminal bus bar due to the moment is hindered because the terminal bus bar collides with the opposing wall parts, so that the deformation caused due to the rotation is prevented.

(2) In the rotation preventing structure of (1), the bolt and the electrode are in parallel and penetrate the terminal bus bar.

According to the rotation preventing structure of the terminal bus bar of the battery connector having the above configuration (2), even when the fastening torque is applied to the bolt and thus the other end portion 49 of the terminal bus bar intends to rotate about the one end portion, the electrode passing through the other end portion is parallel with the bolt, so that the fastening torque applied to the bolt does not serve as the force separating the other end portion fastened to the electrode, unlike the related art.

(3) In the rotation preventing structure of (1) or (2), the terminal bus bar has a bent part between the one end portion and the other end portion of the bus bar, and the opposing wall parts hold the terminal busbar at a position between the one end portion and the bent part of the terminal busbar.

According to the rotation preventing structure of the terminal bus bar of the battery connector having the above configuration (3), when the fastening torque is applied to the bolt fixed to the one end portion of the terminal bus bar, the terminal bus bar collides with the opposing wall parts at the front of the bent part, so that the rotation thereof is hindered. Thereby, the deformation of the bent part is prevented.

According to the rotation preventing structure of the terminal bus bar of the battery connector of the invention, even when the fastening torque is applied to the bolt fixed to the one end portion of the terminal bus bar, the terminal bus bar and the case are not deformed and the fastening part of the electrode that is fixed to the other end portion of the terminal bus bar is not unfastened.

The invention has been briefly described. Also, the invention will be more clarified by perusing a following embodiment for implementing the invention (hereinafter, referred to as 'illustrative embodiment') with reference to the accompanying drawings.

DESCRIPTION OF EMBODIMENTS

Figure 1:
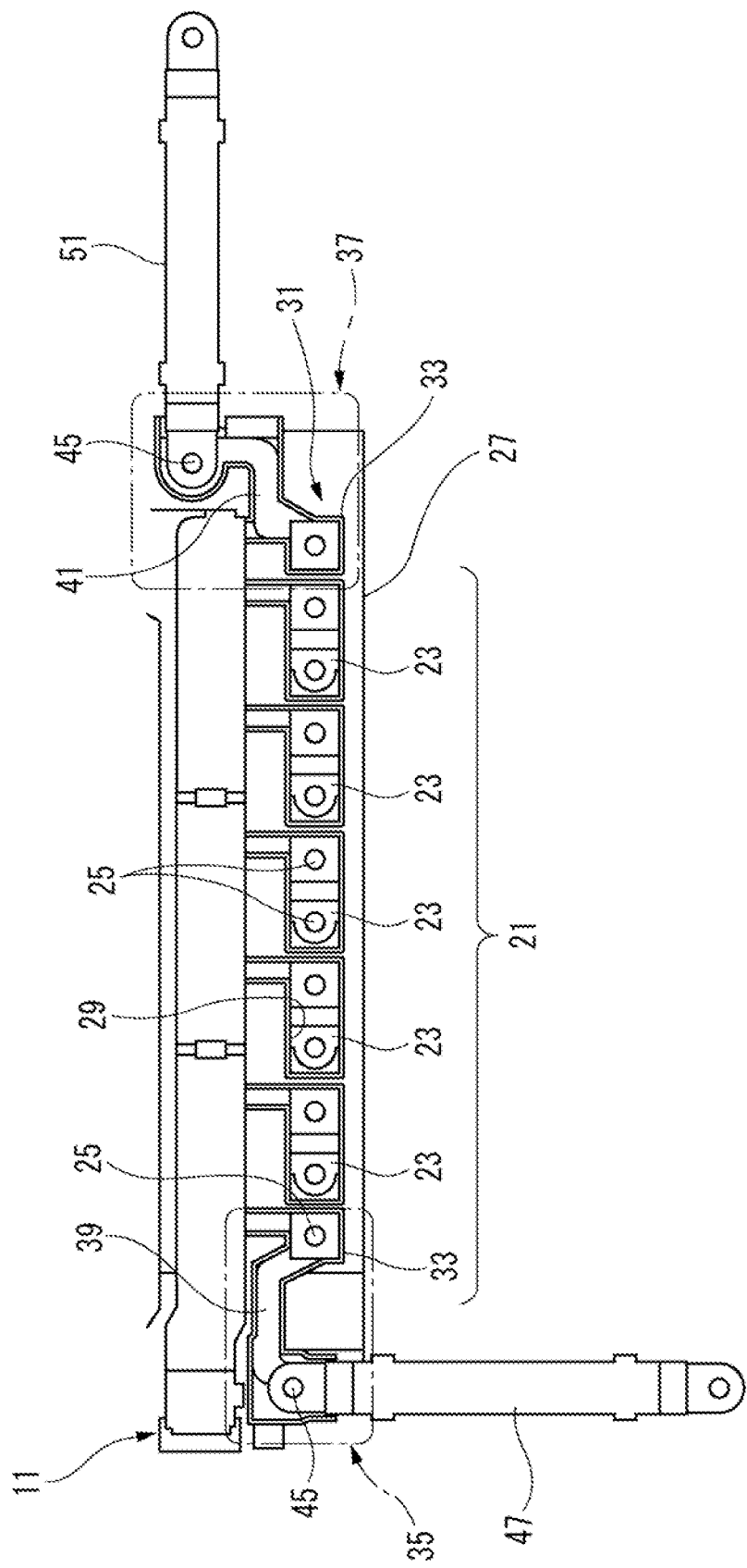
FIG. 1 is a plan view of a battery connector having a rotation preventing structure of a terminal bus bar according to an illustrative embodiment of the invention.

Hereinafter, an illustrative embodiment of the invention will be described with reference to the drawings.

As shown in FIGS. 1 to 7, a rotation preventing structure of a terminal bus bar of a battery connector 11 according to an illustrative embodiment has a battery pack 13, a battery connector 11, first and second terminal bus bars 39, 41 that are terminal bus bars, first and second opposing wall parts 53, 55 that are opposing wall parts and first and second projections 59, 61 that are support projections, as main constitutional elements.

Figure 3:
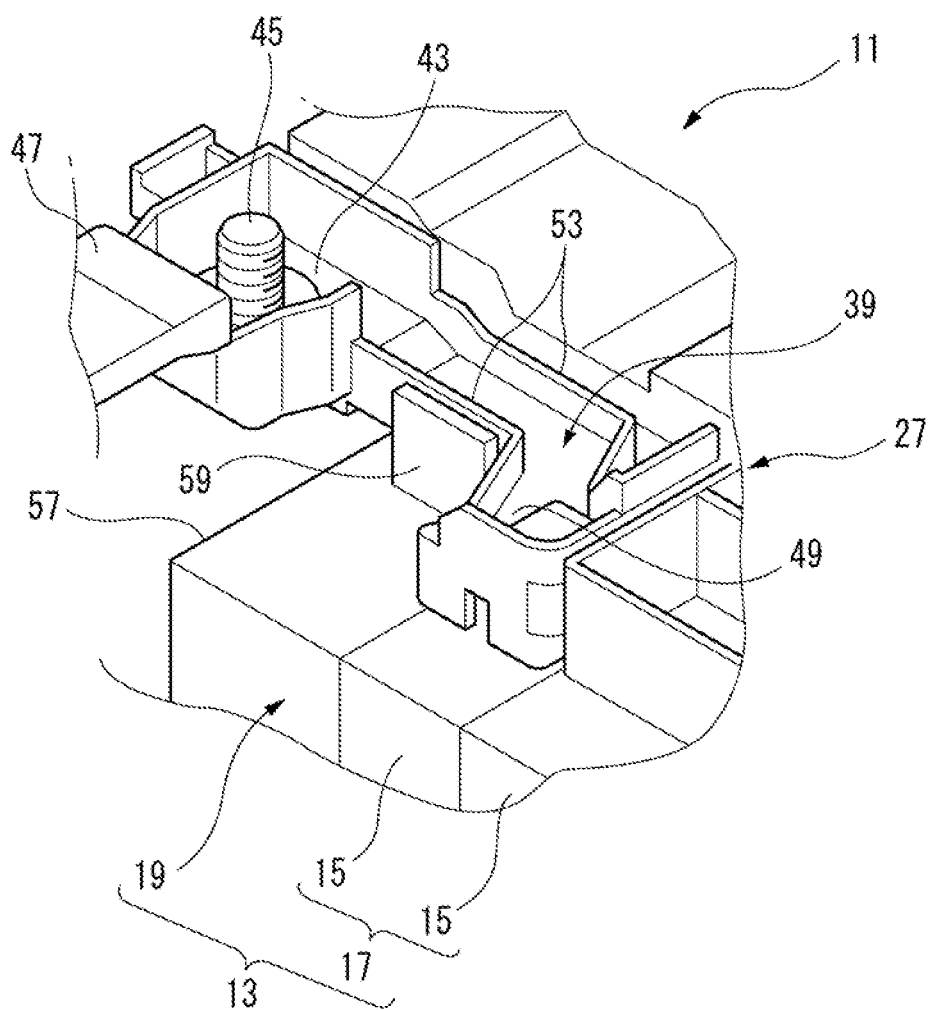
FIG. 3 is a perspective view of the overall plus/minus part shown in FIG. 1.

As shown in FIG. 3, the battery pack 3 has a pack case 19 that accommodates therein a battery assembly 17 having a plurality of batteries 15 arranged thereto. Each battery 15 has a rectangular parallelepiped battery main body and a pair of plus and minus terminals protruding from one end of an upper surface of the battery main body and from the other end thereof. The plus and minus terminals are formed as male screw-shaped electrodes 25 by conductive metal. In the battery assembly 17, the batteries 15 are alternately stacked in an opposite direction so that the plus terminal and the minus terminal are adjacent to each other. In the battery assembly 17, a pair of parallel first terminal line 21 and second terminal line is configured in which the plus and minus terminals of the batteries 15 are alternately arranged. Meanwhile, in this illustrative embodiment, since the first terminal line 21 and the second terminal line have a substantial inversion shape, only the first terminal line 21 is shown and the second terminal line is not shown.

The battery connector 11 is attached to the battery assembly 17 of the battery pack 13 to thus feed power from the battery assembly 17 to an electric motor of an electric vehicle that travels using an electric motor, a hybrid vehicle that travels using an engine and an electric motor, and the like.

The adjacent plus and minus terminals of the first terminal line 21 are connected for each set by a plurality of bus bars 23. The battery assembly 17 connects the plus and minus terminals by the bus bars 23, so that a series connection circuit of the battery 15 and the battery 15 adjacent thereto is formed and a high direct current voltage is obtained. The bus bar 23 is formed by pressing a conductive metal plate, and the plate-shaped metal plate is formed with a pair of plus and minus terminal holes through which the adjacent plus and minus terminals of the adjacent batteries 15 pass. The bus bars 23 are fixed to the battery 15 by screwing nuts onto the electrodes 25 (plus and minus terminals) having passed through the plus and minus terminal holes.

Each bus bar 23 is accommodated in a bus bar accommodation chamber 29 of a case 27 of the battery connector 11. That is, the bus bar accommodation chamber 29 accommodates therein the bus bar 23 that enables the one set of the plus and minus terminals to pass therethrough and connects the same. Here, the case 27 is formed with a bus bar accommodation chamber line 31. The bus bar accommodation chamber line 31 defines the bus bar accommodation chambers 29 that accommodate therein the bus bars 23, respectively. The bus bar accommodation chamber line 31 has, as a whole, a rectangular parallelepiped shape that is long in a direction along which the bus bar accommodation chambers 29 continue.

In this illustrative embodiment, a pair of unitary bus bar accommodation chambers 33 that accommodates therein only the plus terminal or minus terminal is defined at both ends of the bus bar accommodation chamber line 31 of the case 27 in the line direction. The plus and minus terminals that are accommodated in the pair of unitary bus bar accommodation chambers 33 become both ends of the series connection circuit of the battery assembly 17.

The battery connector 11 is provided at both ends of the bus bar accommodation chamber line 31 in the line direction with a first overall plus/minus part 35 and a second overall plus/minus part 37 that are the overall plus/minus parts. The first overall plus/minus part 35 has a first terminal bus bar (terminal bus bar) 39. The second overall plus/minus part 37 has a second terminal bus bar (terminal bus bar) 41.

Figure 2:
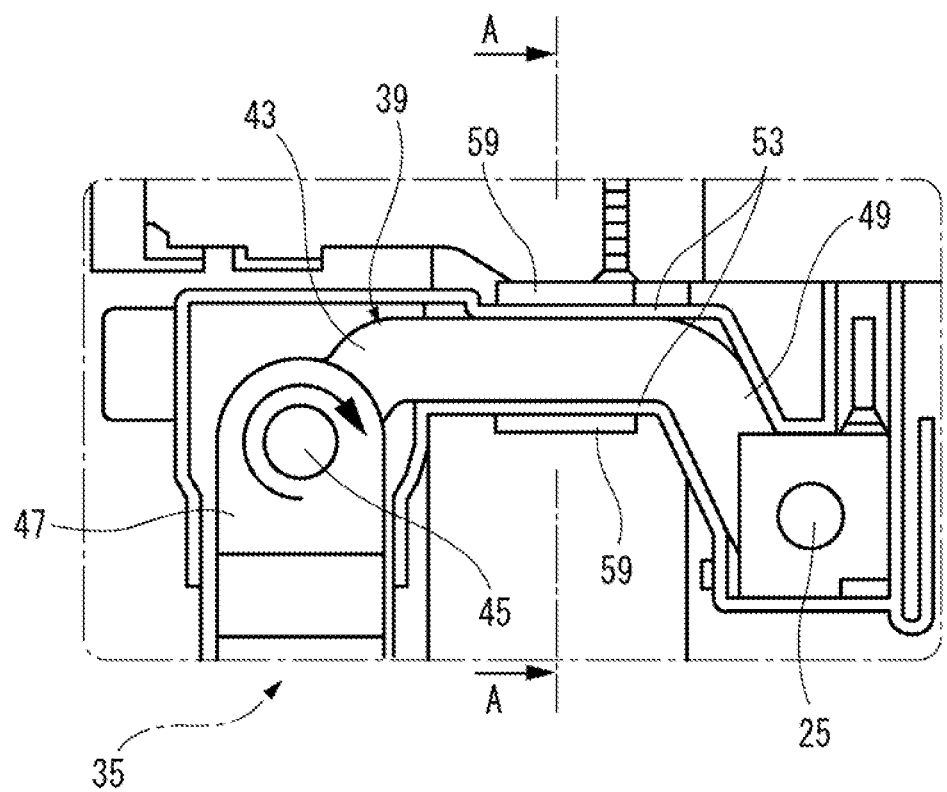
FIG. 2 is an enlarged view of an overall plus/minus part shown in FIG. 1.
Figure 5:
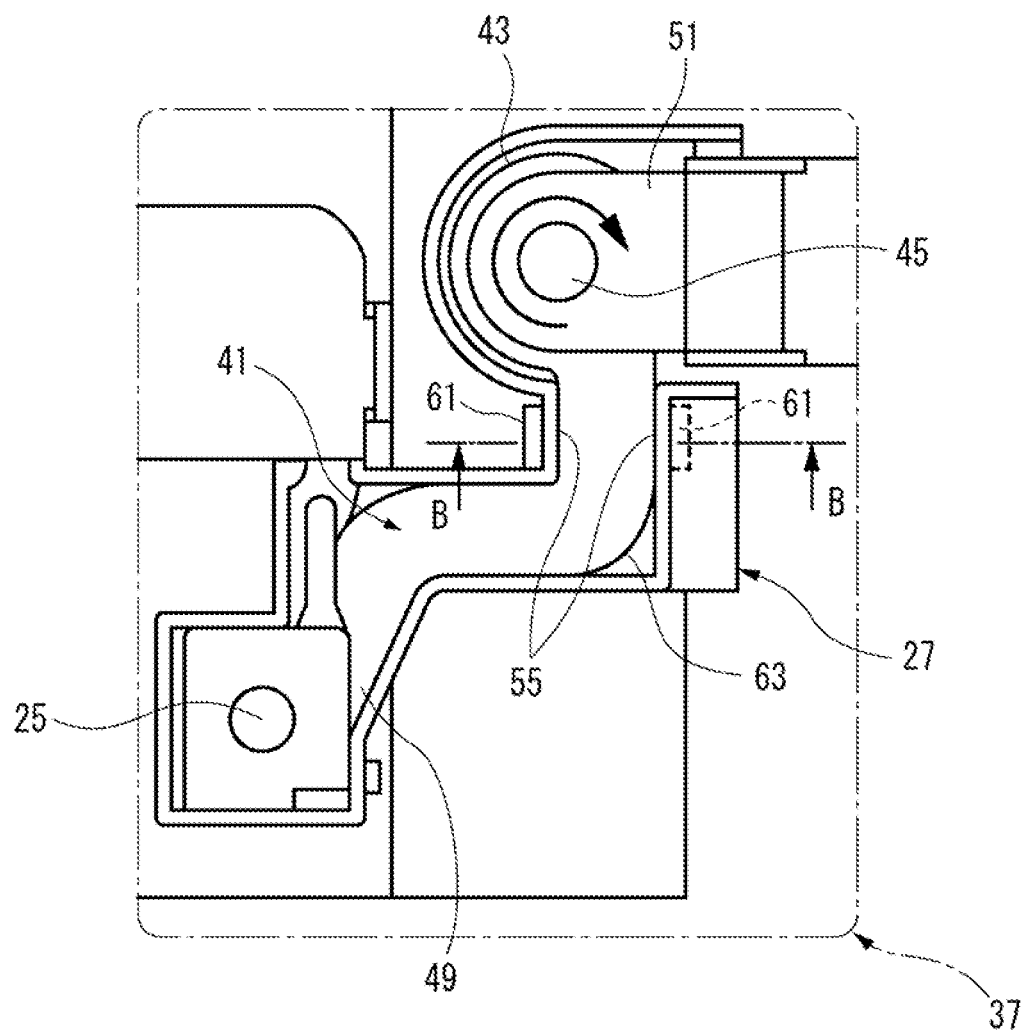
FIG. 5 is an enlarged view of the other overall plus/minus part shown in FIG. 1.

As shown in FIG. 2, the first terminal bus bar 39 is provided to the battery connector 11 and has a configuration where a first external connection bus bar (connection bus bar) 47 is fastened to a crimping bolt (bolt) 45 fixed to one end portion 43 of the first terminal bus bar and the electrode 25 of the battery 15 of the one farthest end is fastened to the other end portion 49 thereof. Also, as shown in FIG. 5, the second terminal bus bar 41 is provided to the battery connector 11 and has a configuration where a second external connection bus bar (connection bus bar) 51 is fastened to a crimping bolt 45 fixed to one end portion 43 of the second terminal bus bar and the electrode 25 of the battery 15 of the other farthest end is fastened to the other end portion 49 thereof.

Figure 6:
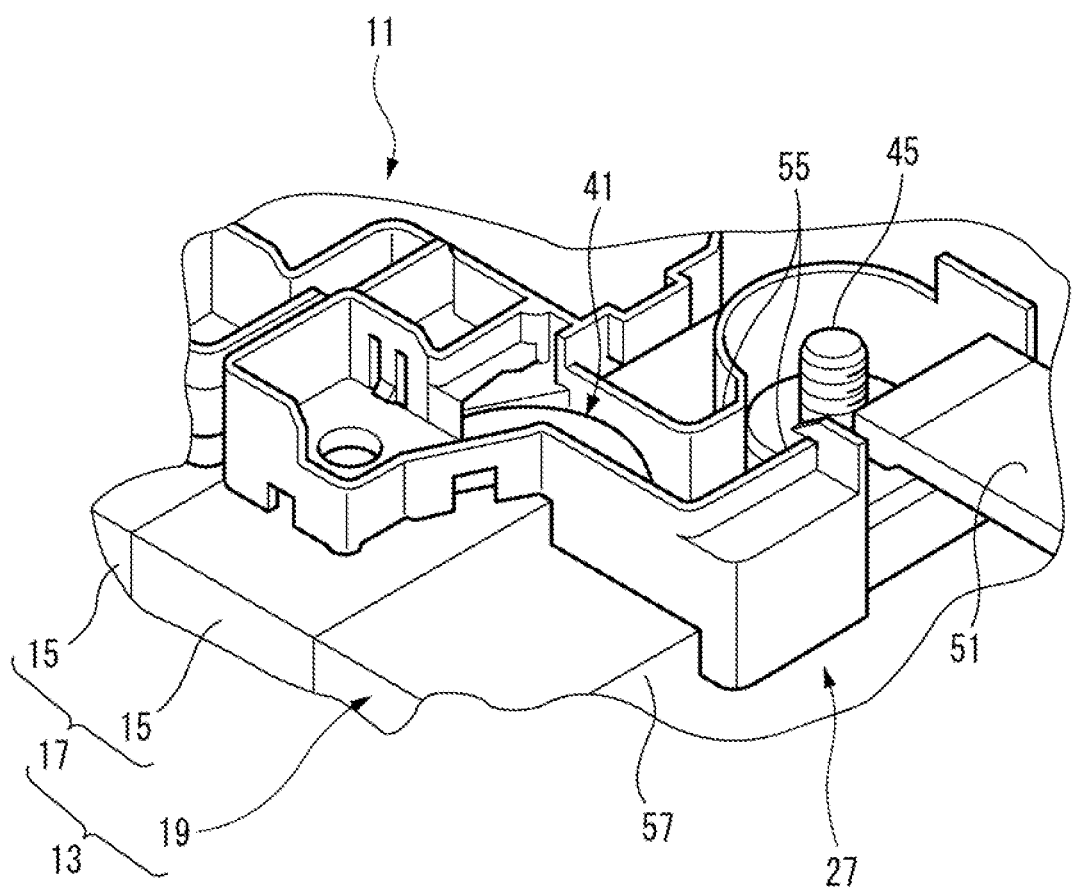
FIG. 6 is a perspective view of the overall plus/minus part shown in FIG. 5.

As shown in FIG. 3, the first overall plus/minus part 35 of the case 27 is formed with first opposing wall parts 53 that are the opposing wall parts holding the one end portion 43 and other end portion 49 of the first terminal bus bar 39 therebetween. Also, as shown in FIG. 6, the second overall plus/minus part 37 of the case 27 is formed with second opposing wall parts 55 that are the opposing wall parts holding the one end portion 43 and other end portion 49 of the second terminal bus bar 41 therebetween.

Figure 4:
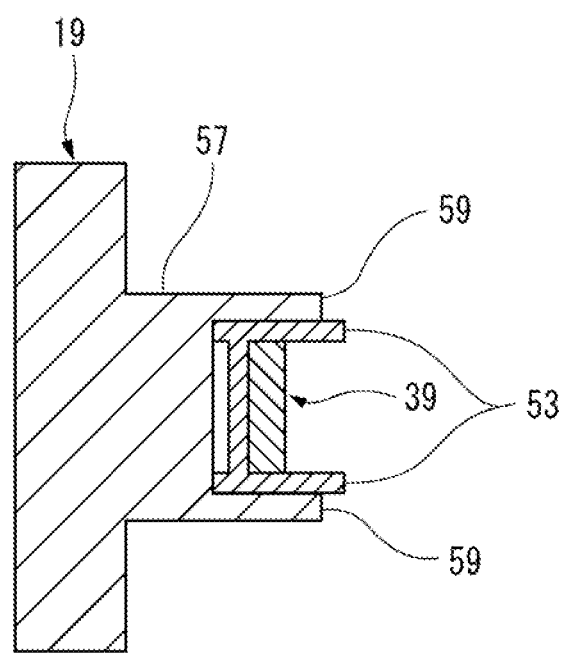
FIG. 4 is a sectional view taken along a line A-A of FIG. 2.
Figure 7:
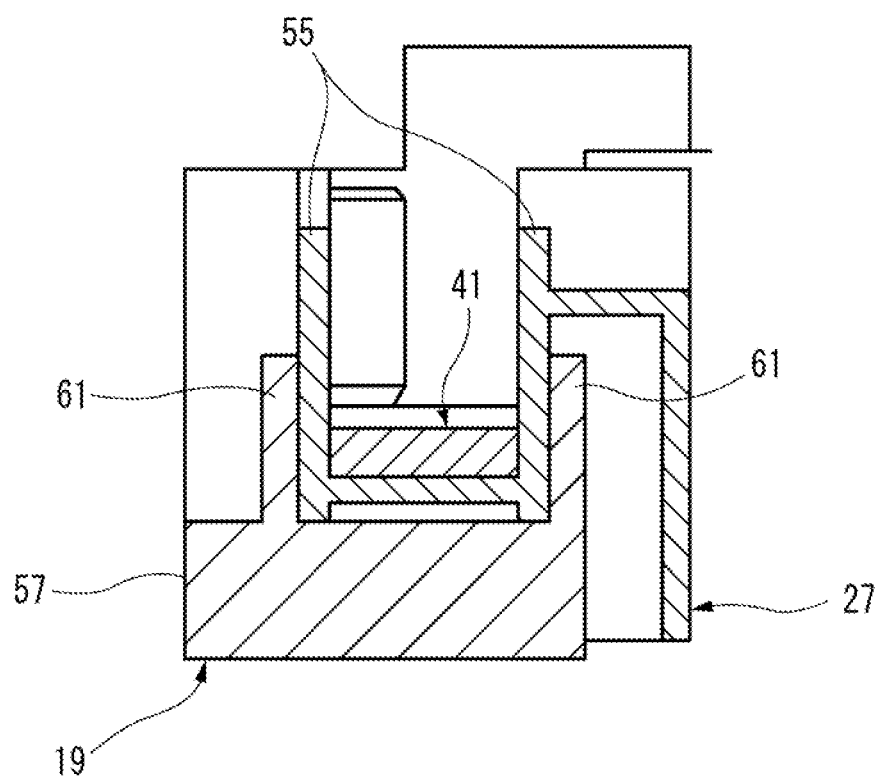
FIG. 7 is a sectional view taken along a line B-B of FIG. 5.
Figure 8:
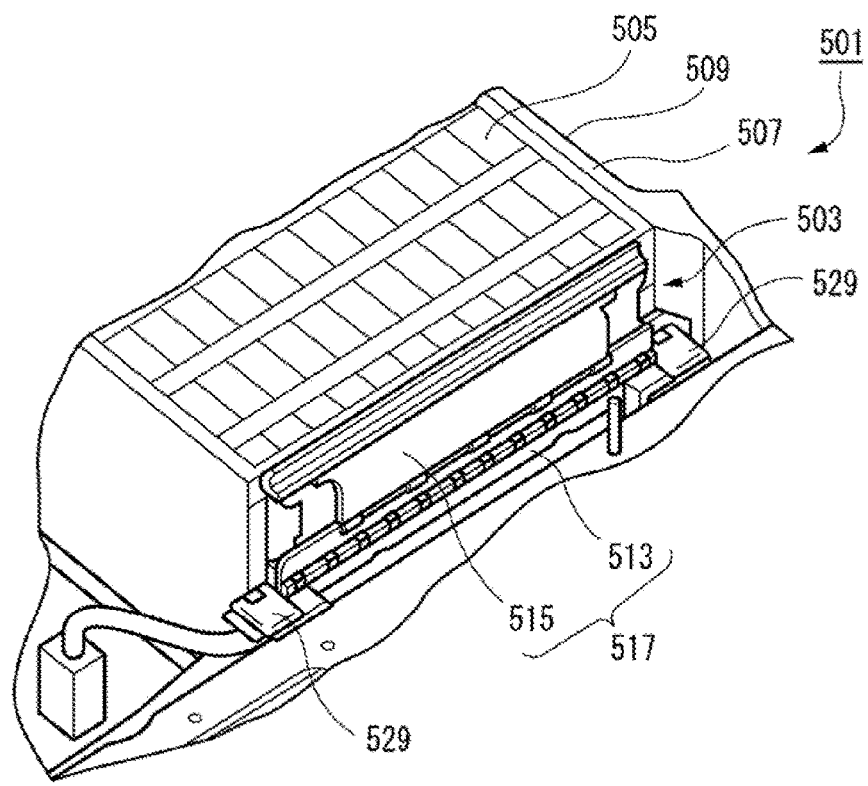
FIG. 8 is a perspective view of a battery pack having a battery connector of the related art mounted thereto.
Figure 9:
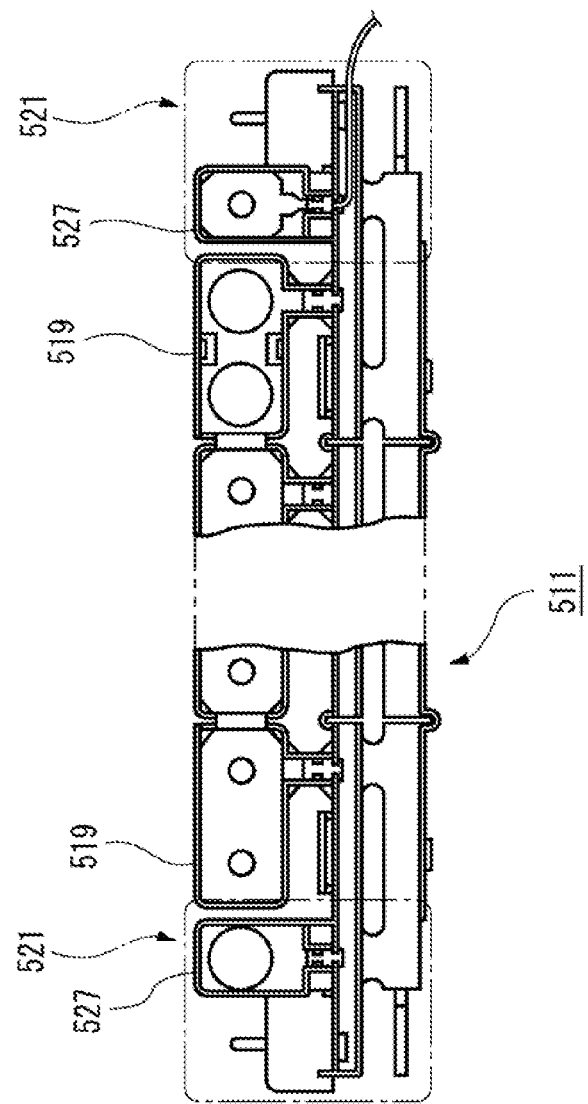
FIG. 9 is a plan view of a case of the battery connector shown in FIG. 8.
Figure 10:
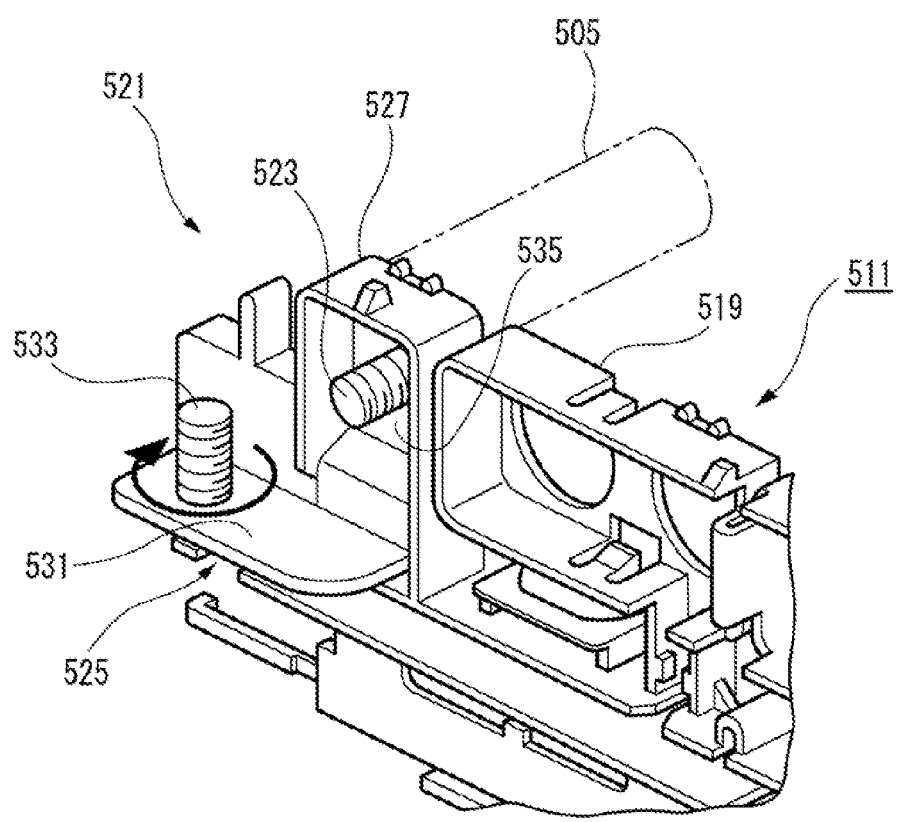
FIG. 10 is a perspective view of main parts of the battery connector in which a terminal bus bar is mounted to the case shown in FIG. 9.
Figure 11:
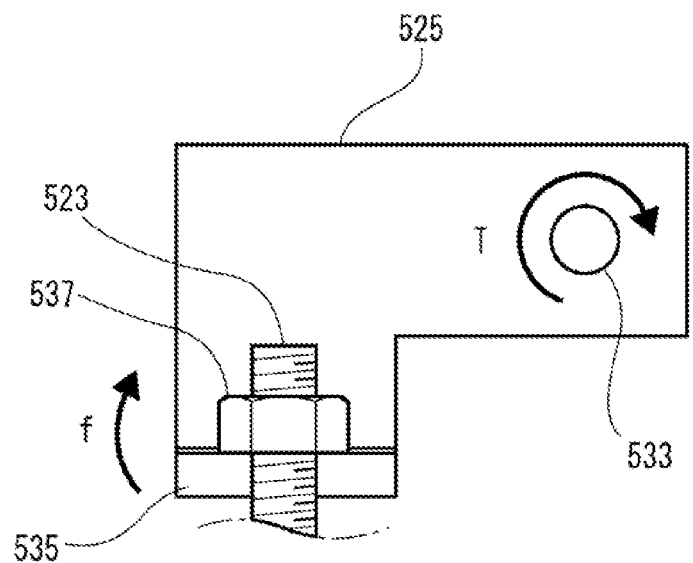
FIG. 11 is a front view of the terminal bus bar shown in FIG. 10.

Also, as shown in FIGS. 4 and 7, a pair of end plates 57 of the pack case 19 is formed with first projections 59 that are the pair of support projections holding the first opposing wall parts 53 from outer sides thereof, and second projections 61 that are the pair of support projections, respectively.

The battery connector 11 has a configuration where the crimping bolts 45 and the electrodes 25 are in parallel and penetrate the first overall plus/minus part 35 and the second overall plus/minus part 37 of the first terminal bus bar 39 and the second terminal bus bar 41.

Also, as shown in FIG. 5, the second terminal bus bar 41 has a bent part 63 that is formed between the one end portion 43 and the other end portion 49. The second terminal bus bar 41 is held between the one end portion 43 and the bent part 63 by the second opposing wall parts 55.

In the below, operations of the rotation preventing structure of the terminal bus bar of the battery connector 11 having the configuration as described above are described.

In the battery connector 11 of this illustrative embodiment, the bus bars 23, the first terminal bus bar 39 and the second terminal bus bar 41 are mounted to the case 27. As shown in FIGS. 2 and 7, the battery connector 11 is attached to the case 27 so that when it is mounted to the battery pack 13, the first opposing wall parts 53 and the second opposing wall parts 55 are introduced between the first projections 59 and between the second projections 61.

In the battery connector 11 attached to the battery pack 13, the electrodes 25 are nut-fastened. At the first overall plus/minus part 35 and the second overall plus/minus part 37, the first connection bus bar 47 and the second connection bus bar 51 of an adjacent module or the outside are overlapped with the crimping bolts 45 of the first terminal bus bar 39 and the second terminal bus bar 41 and the nuts are fastened thereto.

At this time, in the rotation preventing structure of the terminal bus bar of the battery connector 11 according to this illustrative embodiment, when the first and second external connection bus bars 47, 51 are fastened to the crimping bolts 45 fixed to the one end portions 43 of the first and second terminal bus bars 39, 41 and fastening torque at that time is applied to the crimping bolts 45, moments of the fastening direction are respectively generated in the first and second terminal bus bars 39, 41. The rotations of the first and second terminal bus bars 39, 41 due to the moments are hindered because they collide with the first and second opposing wall parts 53, 55, respectively, and the deformations that are caused due to the rotations are prevented.

Also, since the first and second terminal bus bars 39, 41 are not rotated by the fastening torque, the fastening parts of the electrodes 25 that are fixed to the other end portions 49 are not unfastened. Also, even when the moments of the first and second terminal bus bars 39, 41 are respectively applied to the first opposing wall parts 53 and the second opposing wall parts 55, since the first opposing wall parts 53 and the second opposing wall parts 55 have a double rotation preventing structure where the first opposing wall parts 53 and the second opposing wall parts 55 are held from the outer sides thereof between the first projections 59 and the second projections 61 of the end plate 57 having high stiffness, the case 27 is not deformed.

Also, in the rotation preventing structure of the terminal bus bar of the battery connector 11 according to this illustrative embodiment, even when the fastening torque is applied to the crimping bolts 45 and thus the other end portions 49 of the first and second terminal bus bars 39, 41 intend to rotate about the one end portions 43, the electrodes 25 passing through the other end portions 49 are parallel with the crimping bolts 45, so that the fastening torque applied to the crimping bolts 45 does not serve as the force separating the other end portions 49 fastened to the electrodes 25, unlike the related art.

Also, in the rotation preventing structure of the terminal bus bar of the battery connector 11 according to this illustrative embodiment, when the fastening torque is applied to the crimping bolt 45 fixed to the one end portion 43 of the second terminal bus bar 41, the second terminal bus bar 41 collides with the second opposing wall parts 55 at the front of the bent part 63, so that the rotation thereof is hindered. Thereby, the deformation of the bent part 63 is prevented.

Therefore, according to the rotation preventing structure of the terminal bus bar of the battery connector 11 of this illustrative embodiment, even when the fastening torque is applied to the crimping bolts 45 fixed to the one end portions 43 of the first and second terminal bus bars 39, 41, the first and second terminal bus bars 39, 41 and the case 27 are not deformed and the fastening parts of the electrodes 25 that are respectively fixed to the other end portions 49 of the first and second terminal bus bars 39, 41 are not unfastened.

Meanwhile, the rotation preventing structure of the terminal bus bar of the battery connector of the invention is not limited to the above illustrative embodiment and can be appropriately modified and improved. The materials, shapes, sizes, number, arrangement positions and the like of the respective constitutional elements of the above illustrative embodiment are arbitrary and are not particularly limited insomuch as the invention can be implemented.

What is claimed is:

1. A rotation preventing structure of a terminal bus bar of a battery connector comprising:
    a battery pack that includes a pack case in which a battery assembly having arranged batteries is accommodated, the pack case includes an end plate;
    a battery connector that is mounted to the battery pack and includes a battery case; and
    a terminal bus bar that is provided to the battery connector and has a configuration where an external connection bus bar is fastened to a bolt fixed to one end portion of the terminal bus bar and an electrode of the battery at one end of the arranged batteries is fastened to the other end portion of the terminal bus bar; wherein
    the battery connector includes opposing wall parts on the battery case of the battery connector, and the opposing wall parts hold the terminal bus bar between the one end portion and the other end portion of the bus bar; and
    a pair of support projections that is formed on the end plate of the pack case and holds the opposing wall parts from outer sides of the opposing wall parts, and the pair of support projections extends away from the end plate.

2. The rotation preventing structure according to claim 1, wherein the bolt and the electrode are in parallel and penetrate the terminal bus bar.

3. The rotation preventing structure according to claim 1, wherein the terminal bus bar has a bent part between the one end portion and the other end portion of the bus bar, and
    wherein the opposing wall parts hold the terminal bus bar at a position between the one end portion and the bent part of the terminal bus bar.

4. The rotation preventing structure according to claim 2, wherein the terminal bus bar has a bent part between the one end portion and the other end portion of the bus bar, and wherein the opposing wall parts hold the terminal bus bar at a position between the one end portion and the bent part of the terminal bus bar.

5. The rotation preventing structure according to claim 1, further comprising:

a second terminal bus bar that is provided to the battery connector, and has a shape that is different from a shape of the terminal bus bar.

6. The rotation prevention structure according to claim 1, wherein the battery case includes a bus bar accommodation chamber, and the terminal bus bar is accommodated within the bus bar accommodation chamber.

* * * * *